(12) United States Patent
Fecteau et al.

(10) Patent No.: US 9,114,852 B2
(45) Date of Patent: *Aug. 25, 2015

(54) SNOWMOBILE SUSPENSION

(71) Applicant: BOMBARDIER RECREATIONAL PRODUCTS INC., Valcourt (CA)

(72) Inventors: Berthold Fecteau, Richmond (CA); Sebastien Thibault, Sherbrooke (CA); Bertrand Mallette, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,613

(22) Filed: Dec. 10, 2013

(65) Prior Publication Data

US 2014/0090915 A1 Apr. 3, 2014

Related U.S. Application Data

(63) Continuation of application No. 13/516,564, filed as application No. PCT/US2009/068714 on Dec. 18, 2009, now Pat. No. 8,881,856.

(51) Int. Cl.
*B62D 17/00* (2006.01)
*B62M 27/02* (2006.01)

(52) U.S. Cl.
CPC ......... *B62M 27/02* (2013.01); *B62M 2027/026* (2013.01)

(58) Field of Classification Search
USPC .................................................. 180/190, 193
See application file for complete search history.

(56) References Cited

U.S. PATENT DOCUMENTS

| | | |
|---|---|---|
| 5,727,643 A | 3/1998 | Kawano et al. |
| 5,904,216 A | 5/1999 | Furusawa |
| 6,631,778 B2 | 10/2003 | Mallette |
| 7,070,012 B2 | 7/2006 | Fecteau |
| 7,395,890 B2 | 7/2008 | Visscher |
| 7,523,799 B2 | 4/2009 | Yoshihara |
| 7,854,285 B1 | 12/2010 | Giese |

(Continued)

FOREIGN PATENT DOCUMENTS

| | | |
|---|---|---|
| RU | 25724 U1 | 10/2002 |
| RU | 2008103647 A | 8/2009 |

OTHER PUBLICATIONS

International Search Report of PCT/US2009/068714, Feb. 23, 2013, Lee W. Young.

(Continued)

*Primary Examiner* — Tony Winner
(74) *Attorney, Agent, or Firm* — BCF LLP

(57) ABSTRACT

A suspension assembly for a snowmobile comprises first and second suspension arms pivotally connected to a chassis and to a rail, and extending forwardly and upwardly from the rail. A bracket arm is fixedly connected to the first suspension arm. A link is pivotally connected to the bracket arm. A first shock absorber is pivotally connected to the first suspension arm and to the rail. The lower end of the first shock absorber is disposed forwardly of the lower end of the first suspension arm. A second shock absorber is pivotally connected to the link and to second suspension arm. The lower end of the second shock absorber is disposed rearwardly of the lower end of the first shock absorber. A tie rod is pivotally connected to the link, and to the second suspension arm. A snowmobile having such suspension system is also disclosed.

9 Claims, 10 Drawing Sheets

(56) References Cited

U.S. PATENT DOCUMENTS

| | | |
|---|---|---|
| 8,151,923 B1 | 4/2012 | Giese |
| 8,499,877 B1 | 8/2013 | Giese |
| 2005/0016784 A1 | 1/2005 | Fecteau |
| 2007/0175686 A1 | 8/2007 | Yoshihara |

OTHER PUBLICATIONS

English Abstract of RU2008103647,Published Aug. 10, 2009, Retrieved from the Internet: <URL:http://worlwide.espacenet.com on Jan. 31, 2014.

SNOWMOBILE SUSPENSION

CROSS-REFERENCE

The present application is a continuation of U.S. patent application Ser. No. 13/516,564, filed Jun. 15, 2012, which is a National Phase Entry of International Patent Application No. PCT/US2009/068714, filed Dec. 18, 2009, the entirety of both of which is incorporated herein by reference.

FIELD OF THE INVENTION

The present invention relates to suspension assemblies for tracked vehicles, and more particularly to rear suspension assemblies for snowmobiles.

BACKGROUND

Irregularities in the terrain over which a tracked vehicle travels produce displacements and deflections of its suspension system. Depending upon their magnitude, frequency and strength, these deflections cause more or less discomfort to the operator and passenger of the snowmobile.

The dynamic response of a rear suspension assembly of a tracked vehicle such as a snowmobile, to the multitude of loads imposed upon it during operation, has a significant effect on the overall performance of the vehicle and rider comfort. Different types of loads are regularly exerted upon a tracked vehicle. A first type of loads results from impact loads imposed upon the rear suspension as the vehicle travels over rough terrain and encounters bumps, these are of the most concern. A second type of loads results from loads resulting from acceleration and deceleration. The internal forces that are developed during rapid acceleration cause a weight transfer from the front of the vehicle to the rear. This tends to lift the skis off the ground and thus interferes with steering. The internal forces developed during rapid deceleration cause, however, a weight transfer from the rear of the vehicle to the front. This tends to compress the front of the tunnel toward the front of the slide rails. The complex interaction of the forces which occur in the rear suspension assembly during operation have demanded optimal design of mechanisms for absorbing and attenuating the complex combination of loads imposed upon a modern high performance snowmobile.

Conventionally, the rear suspension supports the endless track, which is tensioned to surround a pair of parallel slide rails, a plurality of idler wheels and at least one drive wheel or sprocket. A shock absorbing mechanism involving compressed springs, hydraulic dampers, and/or other shock absorbing elements, urges the slide frame assembly and the chassis (also known as a frame) of the snowmobile apart, against the weight supported above the suspension in a static condition.

One example of a conventional rear suspension of a snowmobile is described in U.S. Pat. No. 5,727,643, issued to Kawano et al. on Mar. 17, 1998. Kawano et al. discloses a suspension device for providing a resilient support for a snowmobile body, including a frame for supporting the snowmobile body. A slide rail is operatively connected to the frame for pressing a crawler belt against a snow surface. A swing arm includes a first end pivotally supported on the frame and a second end pivotally mounted on the slide rail. A shock absorber assembly includes a first end pivotally supported on a shaft adjacent to the first end of the swing arm, a second end of the shock absorber assembly being connected to the frame through a progressive link pivotally supported on the swing arm.

Another example of a conventional rear suspension of a snowmobile is disclosed in U.S. Pat. No. 5,904,216, issued to Furusawa on May 18, 1999. Furusawa discloses a rear suspension of a snowmobile including two angular suspension arm assemblies, which connect the slide frame assembly to the snowmobile chassis. These suspension arm assemblies are moveable independently of one another in order to permit the slide frame assembly to react to static and dynamic forces arising during operation. A single cushion unit extends horizontally and is operatively connected at opposed ends thereof to the respective suspension arm assemblies in order to support and attenuate the loads.

Although conventional rear suspension systems available provide a relatively comfortable ride to the passengers, it is desirable to further improve the rear suspension assemblies for tracked vehicles, particularly snowmobiles. It is also desirable to provide a rear suspension assembly that would be designed to reduce effects due to acceleration and deceleration loads.

SUMMARY

It is an object of the present invention to ameliorate at least some of the inconveniences present in the prior art.

In one aspect, a suspension system for a snowmobile having a chassis and an endless drive track is disclosed. The suspension assembly has a rail for engagement with the endless drive track, a first suspension arm having an upper end adapted for pivotally connecting to the chassis and a lower end pivotally connected to the rail, the first suspension arm extending forwardly and upwardly from the rail, a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail, a bracket arm having a first end and a second end, the first end of the bracket arm being fixedly connected to the first suspension arm between the upper end and the lower end of the first suspension arm, a link having a first end and a second end, the first end of the link being pivotally connected to the second end of the bracket arm above the first suspension arm at a link pivot axis, a shock absorber having an upper end and a lower end, the lower end of the shock absorber being pivotally connected to the second end of the link about a first pivot axis, the first pivot axis being perpendicular to a longitudinal axis of the chassis, the first pivot axis being located between the upper and lower ends of the first suspension arm, the first pivot axis being disposed such that the first suspension arm is disposed between the first pivot axis and the link pivot axis, the upper end of the shock absorber being pivotally connected to the second suspension arm, and a tie rod having a lower end and an upper end, the lower end of the tie rod being pivotally connected to the link at a pivot point, the pivot point being below the first suspension arm, and the upper end of the tie rod being pivotally connected to the second suspension arm.

In a further aspect, the tie rod is pivotally connected to the second end of the link about the first pivot axis.

In an additional aspect, the second end of the bracket arm extends rearwardly and downwardly from the first end of the bracket arm.

In a further aspect, the shock absorber is a second shock absorber. The first end of the link is pivotally connected to the second end of the bracket arm about the link pivot axis. The link pivot axis is perpendicular to the longitudinal axis of the chassis. The link pivot axis is above of the first pivot axis. A first shock absorber has an upper end and a lower end. The upper end of the first shock absorber is pivotally connected to the first suspension arm. The lower end of the first shock absorber is pivotally connected to the rail. The lower end of the first shock absorber is disposed forwardly of the lower end of the first suspension arm.

In an additional aspect, the first end of the bracket arm is fixedly connected to the first suspension arm at a point disposed upwardly of the link pivot axis.

In a further aspect, the upper end of the first suspension arm is adapted for pivotally connecting to the chassis about a second pivot axis. The upper end of the first shock absorber is pivotally connected to the first suspension arm about a third pivot axis. The third pivot axis is perpendicular to the longitudinal axis of the chassis. The lower end of the first suspension arm is pivotally connected to the rail about a fourth pivot axis. The fourth pivot axis is perpendicular to the longitudinal axis of the chassis. When the snowmobile is at rest with no load applied thereon, a distance between the link pivot axis and the fourth pivot axis is at least a third of a distance between the second pivot axis and the fourth pivot axis.

In an additional aspect, the upper end of the first suspension arm is adapted for pivotally connecting to the chassis about a second pivot axis, the second pivot axis being perpendicular to a longitudinal axis of the chassis. When the snowmobile experiences deceleration, an upward reaction force is created at the second pivot axis.

In a further aspect, the upper end of the first suspension arm is adapted for pivotally connecting to the chassis about a second pivot axis. The second pivot axis is perpendicular to a longitudinal axis of the chassis. When the snowmobile experiences acceleration, a downward reaction force is created on the second pivot axis.

In an additional aspect, the upper end of second suspension arm is adapted to be pivotally connected to the chassis via a fixed connection to a link. The link being adapted to be pivotally connected to the chassis.

In a further aspect, the pivot point is below the first suspension arm in a neutral position In an additional aspect, the pivot point is longitudinally between the first suspension arm and the first shock absorber.

In a further aspect, the pivot point is above the first pivot axis.

In an additional aspect, the pivot point is below the first suspension arm when the shock absorber is in an extended position.

In another aspect, a suspension system for a snowmobile having a chassis and an endless drive track. The suspension assembly has a rail for engagement with the endless drive track, a first suspension arm having an upper end adapted for pivotally connecting to the chassis and a lower end pivotally connected to the rail, the first suspension arm extending forwardly and upwardly from the rail, a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail, a bracket arm having a first end and a second end, the first end of the bracket arm being fixedly connected to the first suspension arm between the upper end and the lower end of the first suspension arm, a link having a first end and a second end, the first end of the link being pivotally connected to the second end of the bracket arm above the first suspension arm at a link pivot axis, a shock absorber having an upper end and a lower end, the lower end of the shock absorber being pivotally connected to the second end of the link about a first pivot axis, the first pivot axis being perpendicular to a longitudinal axis of the chassis, the first pivot axis being located between the upper and lower ends of the first suspension arm, the first pivot axis being disposed such that the first suspension arm is disposed between the first pivot axis and the link pivot axis, the upper end of the shock absorber being pivotally connected to the second suspension arm, and a tie rod having a lower end and an upper end, the lower end of the tie rod being pivotally connected to the link, and the upper end of the tie rod being pivotally connected to the second suspension arm. A point adapted for pivotally connecting the second suspension arm to the chassis is vertically higher than a pivotal connection between the upper end of the shock absorber and the second suspension arm.

In a further aspect, the link is a first link. A second link has the point adapted for pivotally connecting the second suspension arm to the chassis. The upper end of second suspension arm is adapted to be pivotally connected to the chassis via a fixed connection to the second link. The fixed connection between the second suspension arm and the second link is vertically higher than the pivotal connection between the upper end of the shock absorber and the second suspension arm.

In an additional aspect, the tie rod is pivotally connected to the second end of the link about the first pivot axis.

In a further aspect, the second end of the bracket arm extends rearwardly and downwardly from the first end of the bracket arm.

In an additional aspect, the shock absorber is a second shock absorber. The first end of the link is pivotally connected to the second end of the bracket arm about the link pivot axis. The link pivot axis is perpendicular to the longitudinal axis of the chassis. The link pivot axis is above of the first pivot axis. A first shock absorber has an upper end and a lower end. The upper end of the first shock absorber is pivotally connected to the first suspension arm. The lower end of the first shock absorber is pivotally connected to the rail. The lower end of the first shock absorber is disposed forwardly of the lower end of the first suspension arm.

In a further aspect, the first end of the bracket arm is fixedly connected to the first suspension arm at a point disposed upwardly of the link pivot axis.

In an additional aspect, the upper end of the first suspension arm is adapted for pivotally connecting to the chassis about a second pivot axis. The upper end of the first shock absorber is pivotally connected to the first suspension arm about a third pivot axis. The third pivot axis is perpendicular to the longitudinal axis of the chassis. The lower end of the first suspension arm is pivotally connected to the rail about a fourth pivot axis. The fourth pivot axis is perpendicular to the longitudinal axis of the chassis. When the snowmobile is at rest with no load applied thereon, a distance between the link pivot axis and the fourth pivot axis is at least a third of a distance between the second pivot axis and the fourth pivot axis.

In a further aspect, the upper end of the first suspension arm is adapted for pivotally connecting to the chassis about a second pivot axis. The second pivot axis is perpendicular to a longitudinal axis of the chassis. When the snowmobile experiences deceleration, an upward reaction force is created at the second pivot axis.

In an additional aspect, the upper end of the first suspension arm is adapted for pivotally connecting to the chassis about a second pivot axis. The second pivot axis is perpendicular to a longitudinal axis of the chassis. When the snowmobile experiences acceleration, a downward reaction force is created on the second pivot axis.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned object and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
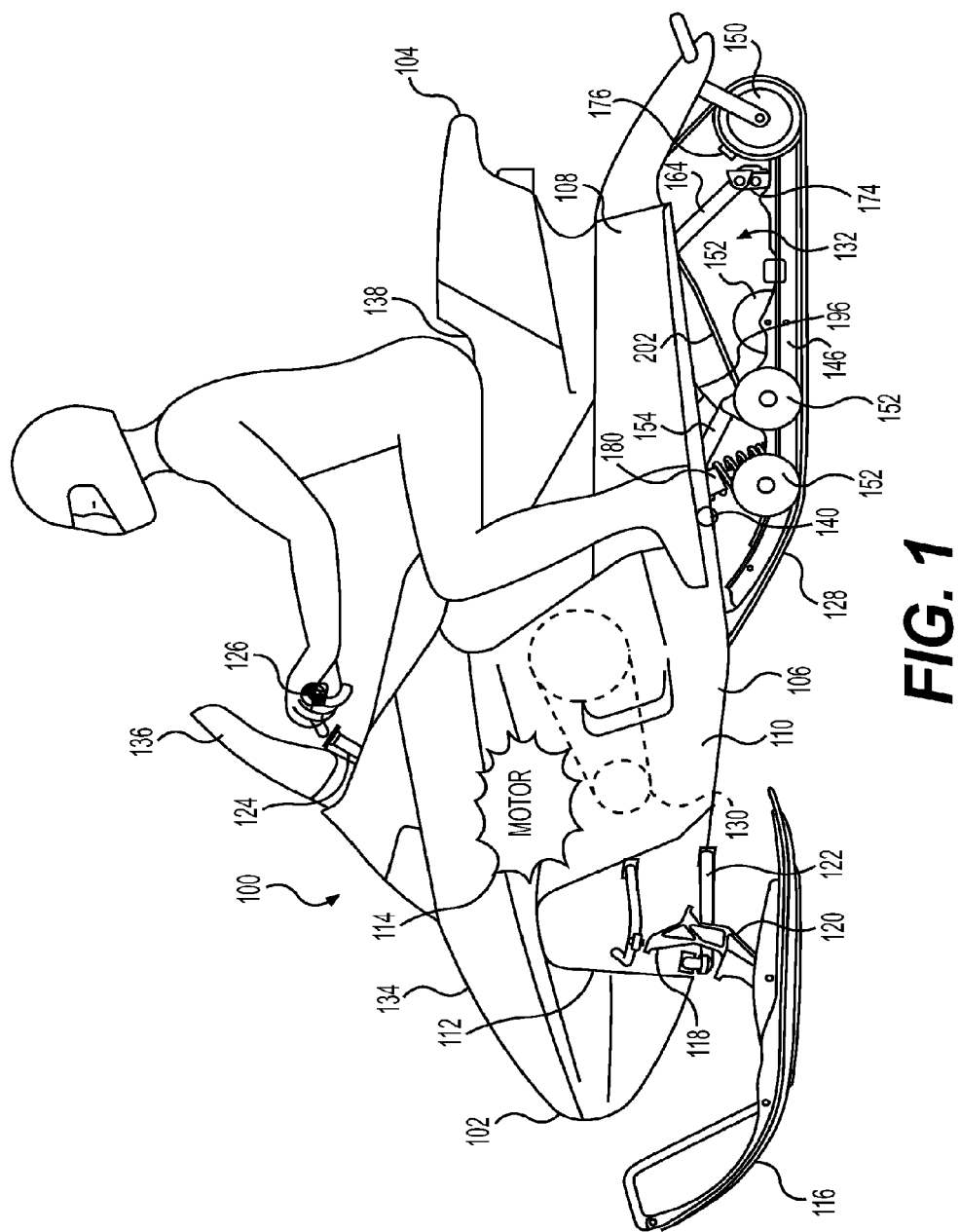
FIG. 1 is a left side elevation view of a snowmobile with a driver on the snowmobile in a straddling position.
Figure 2:
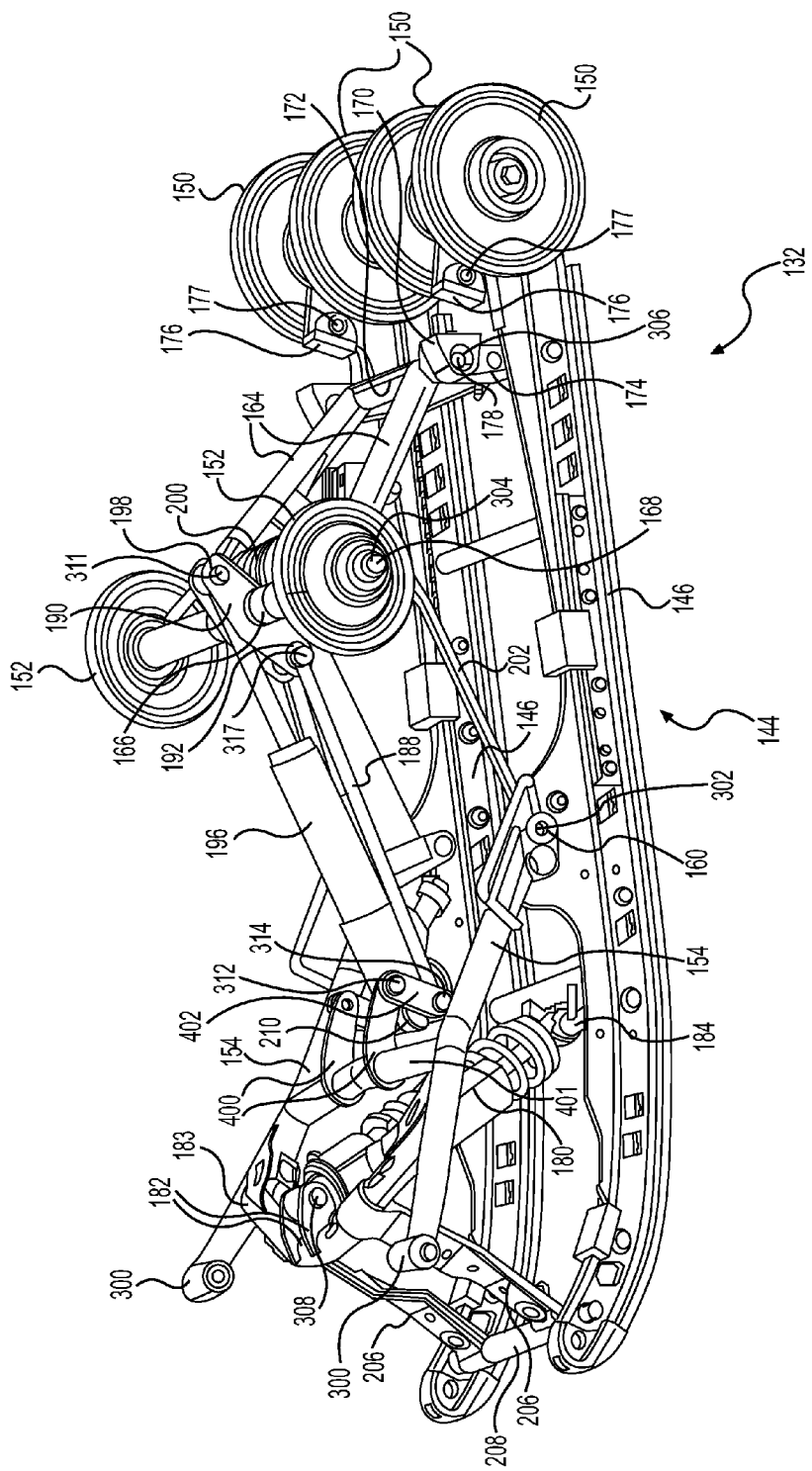
FIG. 2 is a perspective view taken from a front, left side of a suspension assembly according to a first embodiment of the invention.
Figure 3:
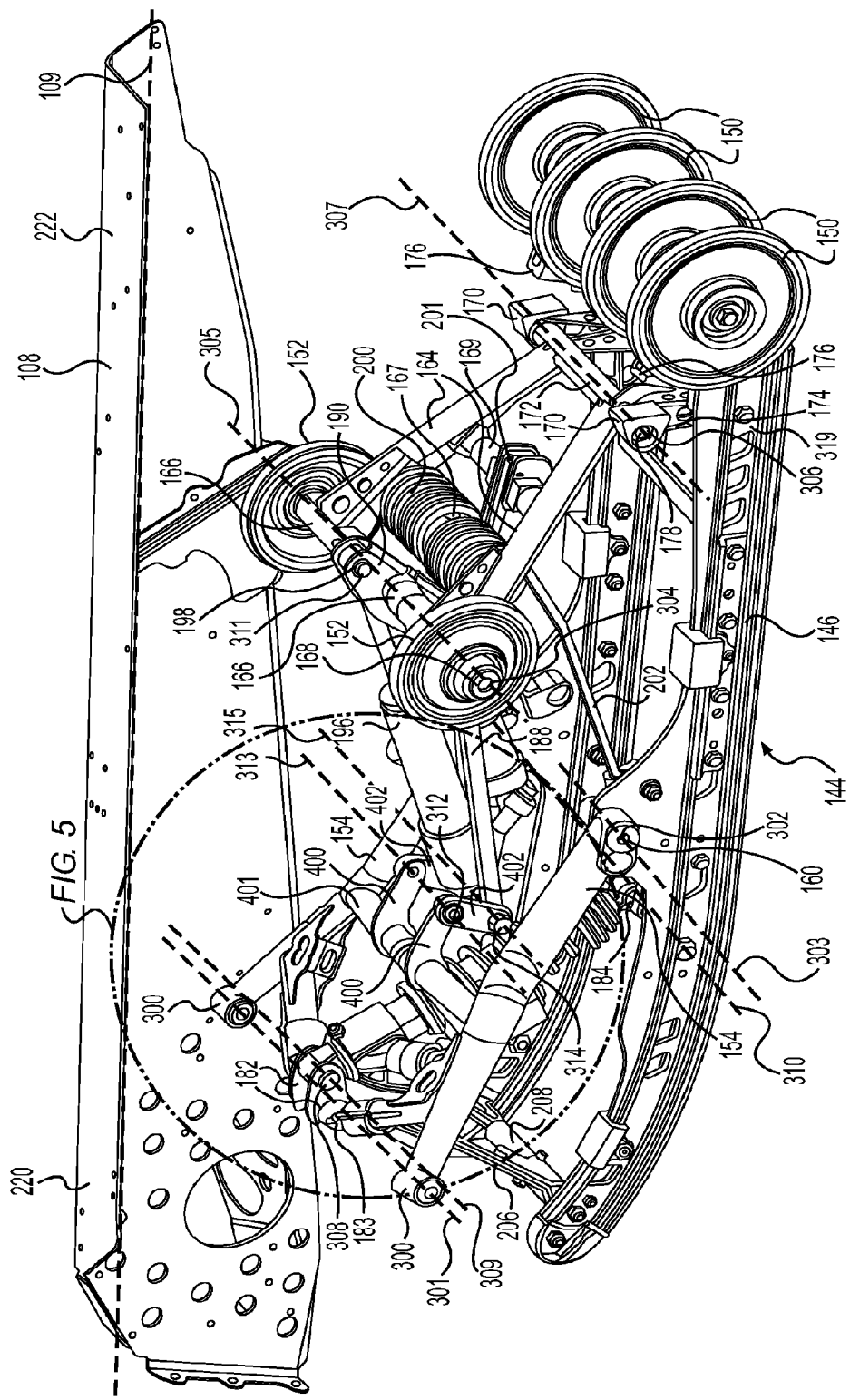
FIG. 3 is a perspective view taken from a rear, left side of the suspension assembly of FIG. 2 with a tunnel shown with some elements removed and the tunnel partially cut off added for clarity.

Referring now in detail to the drawings, and primarily to FIG. 1, a snowmobile incorporating the present invention is identified generally by the reference numeral 100.

The snowmobile 100 includes a front end 102 and a rear end 104, which are defined consistently with the forward travel direction of the vehicle. The snowmobile 100 includes a chassis 106 which normally includes a tunnel 108, an engine cradle portion 110 and a front suspension assembly portion 112. An engine 114 which is schematically illustrated, is carried by the engine cradle portion 110 of the chassis 106. A ski and steering assembly is provided, in which two skis 116 (only one of which is shown) are positioned at the front end 102 of the snowmobile 100, and are attached to the front suspension assembly portion 112 of the chassis 106 through a front suspension assembly 118. The front suspension assembly 118 includes ski legs 120, supporting arms 122 and ball joints (not shown) for operatively joining the respective ski legs 120, supporting arms 122 and a steering column 124. The steering column 124 at its upper end is attached to a steering device such as a handlebar 126 which is positioned forward of a rider and behind the engine 114 to rotate the ski legs 120 and thus the skis 116, in order to steer the vehicle.

An endless drive track 128 is positioned at the rear end 104 of the snowmobile 100 and is disposed under the tunnel 108. The endless drive track 128 is operatively connected to the engine 114 through a belt transmission system 130 which is schematically illustrated by broken lines. Thus, the endless drive track 128 is driven to run about a rear suspension assembly 132 for propulsion of the snowmobile 100. The rear suspension assembly 132 will be described in greater detail below.

At the front end 102 of the snowmobile 100, there are provided fairings 134 that enclose the engine 114 and the belt transmission system 130, thereby providing an external shell that not only protects the engine 114 and the belt transmission system 130, but can also be decorated to make the snowmobile 100 more aesthetically pleasing. Typically, the fairings 134 include a hood and one or more side panels which are all openable to allow access to the engine 114 and the belt transmission system 130 when this is required, for example for inspection or maintenance of the engine 114 and/or the belt transmission system 130. A windshield 136 is connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 extends from the rear end 104 of the snowmobile 100 to the fairings 134. A rear portion of the seat 138 may include a storage compartment, or may be used to accept a passenger seat. Two foot rests 140 (only one of which is shown) are positioned on opposed sides of the snowmobile 100 below the seat 138 to accommodate the rider's feet.

The endless drive track 128 is engaged with and driven by a drive sprocket (not shown) which is journaled by the tunnel 108 and is driven by the engine 114 through the belt transmission system 130. The endless drive track 128 is suspended for movement relative to the chassis 106, by the rear suspension assembly 132. The rear suspension assembly 132 includes a slide frame assembly 144 which primarily includes a pair of spaced apart slide rails 146 that engage the inner side of the ground-engaging portion of the endless drive track 128. The slide frame assembly 144 journals a plurality of backup rollers (not shown) and four idler rollers 150. In addition, further rollers 152 are carried by the tunnel 108, in order to define the path over which the endless drive track 128 travels.

Referring to FIGS. 2 to 5, the rear suspension assembly 132 according to a first embodiment of the invention will now be described in greater details. The rear suspension assembly 132 comprises left and right front suspension arms 154 and left and right rear suspension arms 164. It is contemplated that the left and right rear suspension arms 164 could be welded together to form a single rear suspension arm.

The front suspension arms 154 extend downwardly and rearwardly from a front portion 220 of the tunnel 108. Upper ends of the front suspension arms 154 are pivotally attached to the tunnel 108 at pivot points 300 to form a pivot axis 301 (shown in FIG. 3) that is perpendicular to the longitudinal axis 109 of the tunnel 108. The lower ends of the front suspension arms 154 are each pivotally attached to their respective slide rails 146 of the slide frame assembly 144 by a pivot pin assembly 160 at pivot point 302. Left and right pivot points 302 define a pivot axis 303 (shown in FIG. 3) perpendicular to the longitudinal axis 109 of the tunnel 108. The movement of the front portions of the slide rails 146 relative to the tunnel 108 of the chassis 106 causes the front suspension arms 154 to rotate about the axis 301, relative to the tunnel 108. The front suspension arms 154 are made of metal tubes having a generally circular cross-section. It is contemplated that the front suspension arms 154 could have other cross-sections, and that the front suspension arms 154 could be of another material than metal.

The rear suspension arms 164 extend downwardly and rearwardly from a rear portion 222 of the tunnel 108, and are disposed rearward of the front suspension arms 154. The rear suspension arms 164 are made of metal tubes of a general circular cross-section. It is contemplated that the rear suspension arms 164 could have other cross-sections, and that the rear suspension arms 164 could be of another material than metal. The rear suspension arms 164 are pivotally attached to the tunnel 108 of the chassis 106 at pivot points 304 by means of a tube and shaft assembly. The tube and shaft assembly includes a tube 166 rotatably supported by a shaft 168 which is mounted at the opposite ends thereof to the tunnel 108. The shaft 168 supports the rollers 152 supporting an upper portion of the endless drive track 128. Upper ends of the rear suspension arms 164 are affixed to the tube 166 by welding for example, so that the rear suspension arms 164 are adapted to pivot about the shaft 168. The pivot points 304 and the shaft 168 define a pivot axis 305 (shown in FIG. 3) perpendicular to the longitudinal axis 109 of the tunnel 108. Lower ends of the rear suspension arms 164 are fixedly connected to a hollow cross bar 172. The hollow cross bar 172 is pivotally connected to left and right rocker arms 174 at left and right pivot points 306. The left and right pivot points 306 define a pivot axis 307 (shown in FIG. 3) perpendicular to the longitudinal axis 109 of the tunnel 108. It is contemplated that each of rear rocker arms 174 could be omitted and that each rear suspension arms 164 could be pivotally connected directly to the corresponding slide rail 146. Each of the left and right rear rocker arms 174 is pivotally attached at its lower end to a rear portion of each slide rail 146 at pivot point 319.

Figure 4:
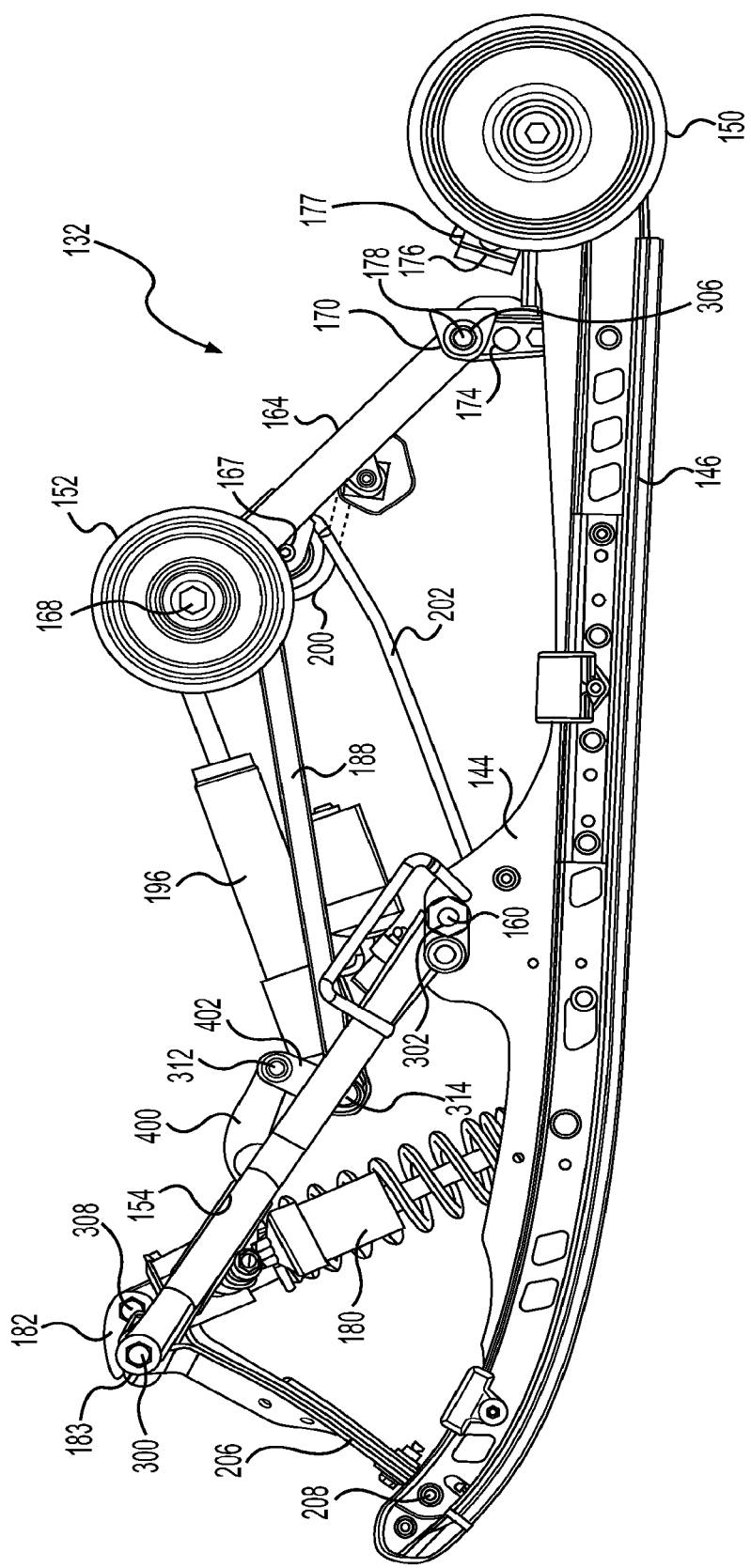
FIG. 4 is a left side elevation view of the suspension assembly of FIG. 2.

Left and right rear blocks 170 are attached to the opposite ends of the hollow cross bar 172. Left and right rear stoppers 176 are attached to their corresponding slide rails 146 at a position rearward of their corresponding left and right rear rocker arms 174 in order to limit the pivot movement of the corresponding left and right rear rocker arms 174 in the clockwise direction (as seen in FIG. 4). Each of the left and right rear stoppers 176 is mounted to a bracket 177 that is in turn mounted to the slide frame assembly 144. The left and right rear stoppers 176 could alternatively be the integral extensions of the slide frame assembly 144. The left and right blocks 170 are preferably made of elastomer, such as rubber, polyurethane resin, delrin or nylon. The left and right blocks 170 could alternatively be made of aluminum. In order to attenuate the impact loads generated when the left and right rear blocks 170 collide with the corresponding left and right rear stoppers 176, the rear stoppers 176 can be made of or coated with a resilient material such as rubber or a polymer. Such a resilient material used on the rear stoppers 176 also helps to reduce wear of the rear blocks 170. It is contemplated that the rear suspension assembly 132 could comprise left and right front stoppers disposed forwardly from each of the left and right rear rockers 174 to limit the pivot movement of the rear rocker arms 174 in the counterclockwise direction (as seen in FIG. 4).

The rear suspension arms 164 are coupled to the front suspension arms 154 such that, in operation, a motion of the rear portion 222 of the tunnel 108 can induce a related motion of the front portion 220 of the tunnel 108. Coupling is ensured by connecting a rear shock absorber 196 between the front suspension arms 154 and the rear suspension arms 164, as it will be described in greater details below. It is contemplated the coupling could be ensured differently.

A front shock absorber assembly 180 disposed between the tunnel 108 and the slide frame assembly 144 extends rearwardly and downwardly from the front portion 220 of the tunnel 108. The front shock absorber assembly 180 is disposed partially forward of the front suspension arms 154. A lower end of the first shock absorber assembly 180 is disposed forwardly of the lower ends of the front suspension arms 154. The front shock absorber assembly 180 is a damping unit which usually includes a hydraulic damper and a coil spring for absorbing the impact energy when impact forces are applied to the opposite ends of the damping unit. The coil spring biases the damping unit toward an extended position so that the hydraulic damper is in the best position to absorb the impact energies. Since shock absorber assemblies of the type of the shock absorber assembly 180 are well known in the art, it will not be further described herein.

The front shock absorber assembly 180 is operatively attached at an upper end thereof to the tunnel 108 by a shaft and front bracket assembly comprising a shaft 183 and two brackets 182. The shaft 183 is welded to the front suspension arms 154 and extends in an arcuate shape in between the front suspension arms 154. It is contemplated that the shaft 183 could not have an arcuate shape. The two brackets 182 are fixedly connected to the shaft 183 near a center of the shaft 183. The upper end of the front shock absorber assembly 180 is pivotally connected to the brackets 182 at pivot points 308 such that an axial force is applied to the upper end of the front shock absorber assembly 180 when the front suspension arms 154 move with respect to the tunnel 108. The pivot points 308 define a pivot axis 309 perpendicular to the longitudinal axis 109 of the tunnel 108. The front shock absorber assembly 180 is pivotally connected to a lower end thereof to the slide frame assembly 144 via a shaft 184. The shaft 184 is fixedly connected to the left and right slide rails 146, extending between them. The front shock absorber assembly 180 is adapted to rotate about the shaft 184. The shaft 184 defines a pivot axis 310.

The rear shock absorber 196 extends forwardly and downwardly from the rear portion 222 of the tunnel 108, and is disposed at least in part rearwardly of the front suspension arms 154. The rear shock absorber 196, similar to the hydraulic damper of front shock absorber assembly 180, is well known in the art, and therefore will not be described in detail. The rear shock absorber 196 is pivotally connected at its upper end to the tunnel 108 via a rear bracket 190 (shown in FIG. 2 and described below) mounted on the tube 166 and shaft 168 assembly of the rear suspension arms 164. The rear shock absorber 196 is connected at a lower end to the front suspension arms 154 via a pivot connection to left and right bracket arms 400 and the left and right links 402 (all described in greater details below).

The rear bracket 190 is fixedly connected to the tube 166. As mentioned above, the tube 166 is rotatable over the shaft 168. The rear bracket 190 comprises two pins 192, 198 diametrically opposite to each other. It is contemplated that the rear bracket 190 could be two rear brackets, each rear bracket comprising one of the pins 192, 198. The pin 192 is pivotally connected to the upper ends of the tie rods 188 at pivot point 317. The pin 198 pivotally connects the rear bracket 190 to the upper end of the rear shock absorber 196 at pivot point 311.

The tie rods 188 are left and right tie rods disposed on each side of the rear shock absorber 196. A lower end of each of the left and right tie rods 188 is pivotally connected to a corresponding one of the left and right links 402. An upper end of each of the left and right tie rods 188 is pivotally connected to the pin 192 of the rear bracket 190. It is contemplated that two pins 192 could be used to receive the upper ends of the left and right tie rods 188.

Upon motion of the rear suspension arms 164, the two pins 192, 198 rotate with the tube 166 about the shaft 168 thereby actuating the rear shock absorber 196 and moving the left and right tie rods 188. The shock absorber 196, the tie rods 188 and the links 402 form an assembly through which the pivot movement of the rear suspension arms 164 about the shaft 168 and relative to the tunnel 108 of the chassis 106 forces the left and right bracket arms 400 to act on the front suspension arms 154 thereby applying a force to the front portion 220 of the tunnel 108, and thereby actuating the front shock absorber assembly 180.

The left and right bracket arms 400 have upper ends fixedly connected to a shaft 401, and are disposed adjacent to each other, near a center of the shaft 401. The shaft 401 is fixedly connected, preferably by welding, to the front suspension arms 154 at a location between the pivot axes 301 and 303. Second ends of the left and right bracket arms 400 are pivotally connected to first ends of corresponding left and right links 402 at pivot points 312. The pivot points 312 define a pivot axis 313 (shown in FIG. 5) perpendicular to the longitudinal axis 109 of the tunnel 108. Second ends of the left and right links 402 are pivotally connected to a corresponding one of the tie rods 188 at pivot points 314. The pivot points 314 define a pivot axis 315 (shown in FIG. 5) perpendicular to the longitudinal axis 109 of the tunnel 108. It is contemplated that the left and right links 402 could form a single link.

Figure 5:
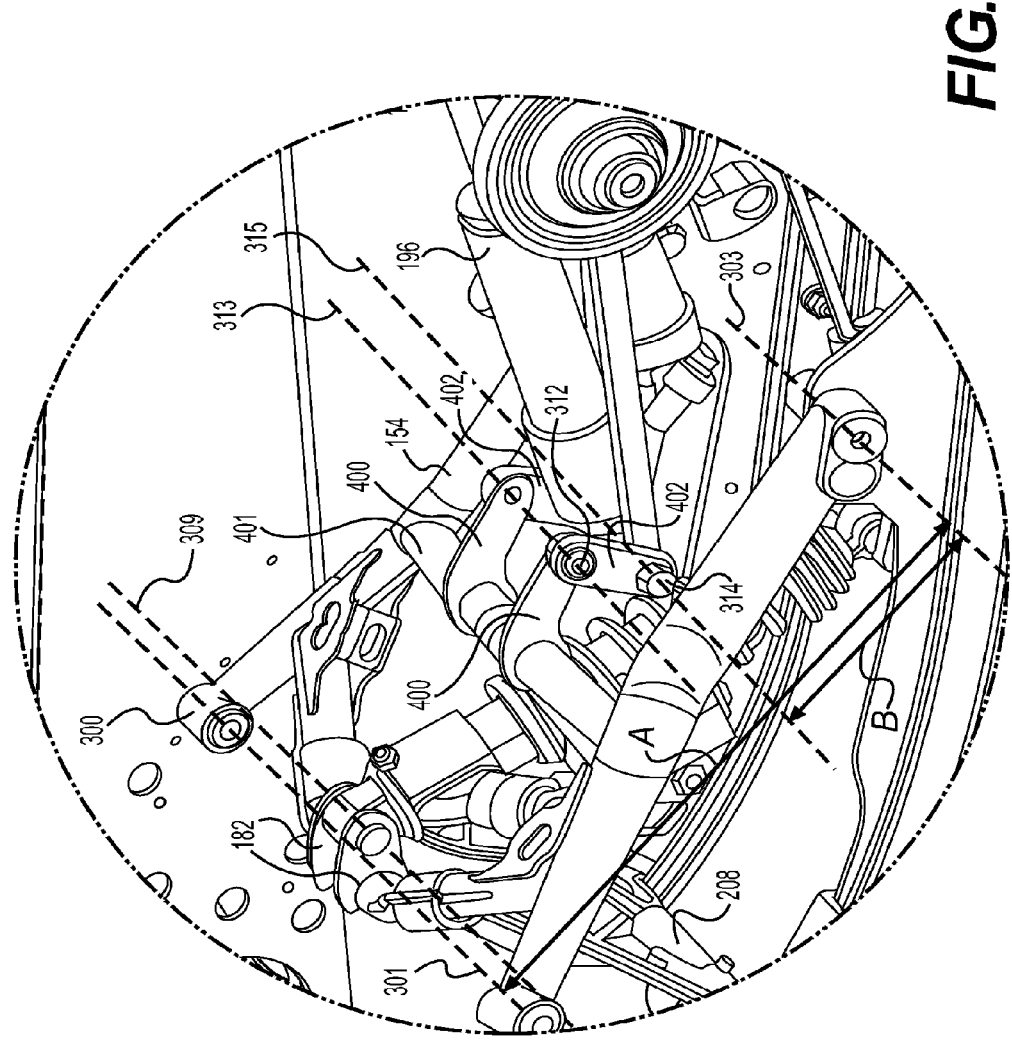
FIG. 5 is a close-up view of the circled portion of the suspension assembly of FIG. 2.

As best seen in FIG. 5, the position and dimension of the left and right bracket arms 400 and the left and right links 402 are such that a distance B between the pivot axes 315 and 303 is at least A/3, when A is a distance between the pivot axes 301 and 303 computed when the snowmobile 100 is in a neutral position. The neutral position is a position of the snowmobile 100 when the snowmobile 100 is at rest without load applied thereon (such as the weight of a driver or luggage).

Left and right torsion springs 200 are provided in order to push the slide frame assembly 144 apart from the tunnel 108 of the chassis 106, and to maintain the front and rear shock absorber assemblies 180, 196 substantially in extended condition when no substantial loads are applied thereon. The left and right torsion springs 200 surround an intermediate shaft 167 and are positioned at each end thereof. A first free end 201 (seen in FIG. 3) of each of the torsion springs 200 is abutting a second intermediate shaft 169, and a free second end 202 thereof is abutting the slide frame assembly 144, under a preloaded condition so that a predetermined torsion of force is applied to the rear suspension arms 164, tending to pivot the rear suspension arms 164 about the shaft 168 away from the tunnel 108 of the chassis 106. It is contemplated that only one torsion spring could be used.

Left and right flexible tension straps 206 are attached at their upper ends to the shaft 183, and are attached at their lower ends to the slide frame assembly 144 by means of a cross bar 208 which extends between and is attached at its opposite ends to the front ends of the slide rails 146. The flexible tension straps 206 prevent the slide frame assembly 144 from being pushed too far away from the tunnel 108.

Figure 6:
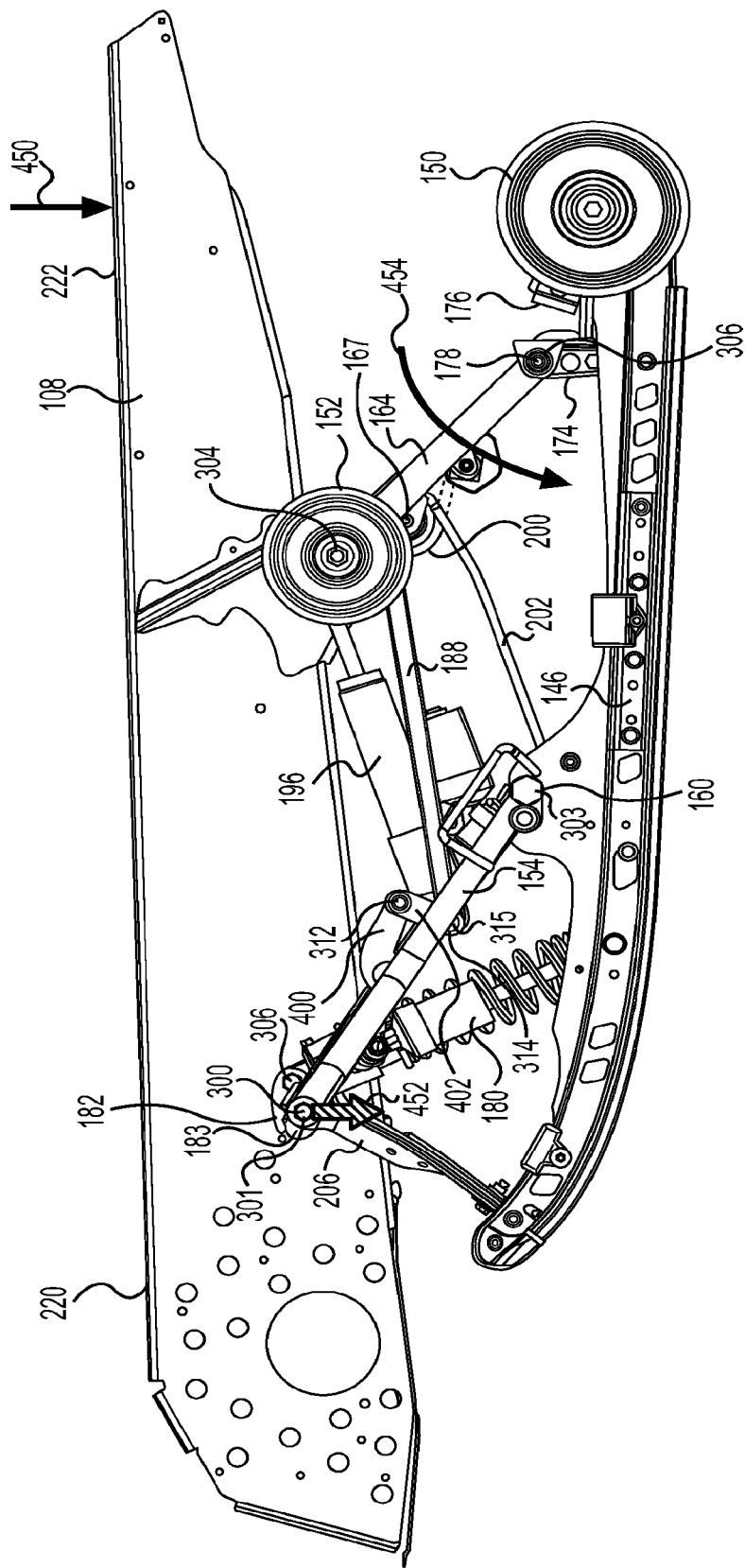
FIG. 6 is a left side elevation view of the suspension assembly of FIG. 2 experiencing an acceleration of the snowmobile with a tunnel cut away for clarity.
Figure 7:
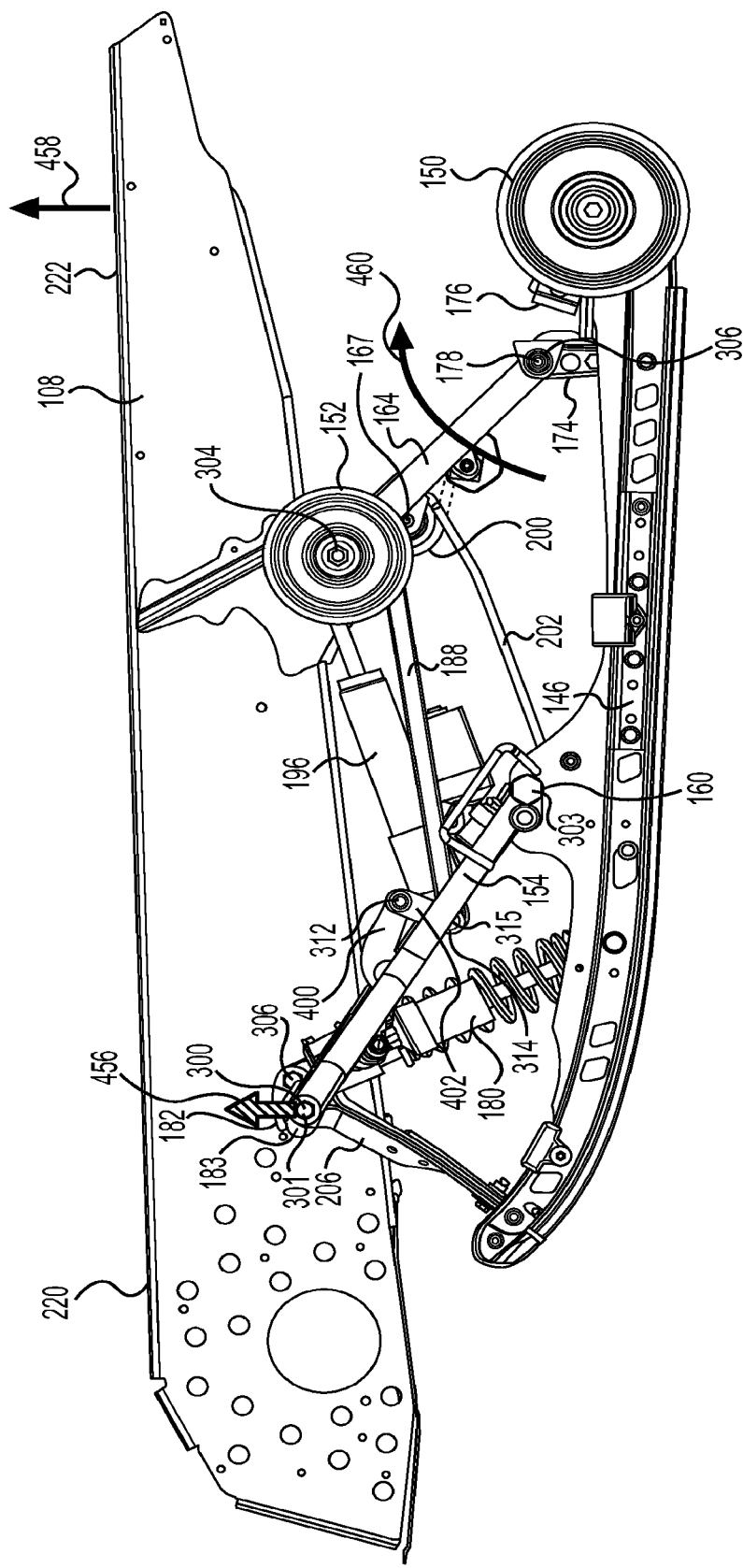
FIG. 7 is a left side elevation view of the suspension assembly of FIG. 2 experiencing a deceleration of the snowmobile with a tunnel and some portions of the suspension assembly cut away for clarity.

Turning now to FIGS. 6 and 7, operation of the rear suspension assembly 132 will be described.

FIG. 6 shows an arcuate solid arrow 454 indicating motion of the rear suspension arms 164 and a straight solid arrow 450 showing movement of the rear portion 222 of the tunnel 108 when the snowmobile 100 experiences acceleration with reference to the neutral position. When a snowmobile experiences acceleration, weight is transferred toward the rear end of the snowmobile resulting in a downward movement of the rear portion of the tunnel. This weight transfer would normally result in an upward movement of the front portion of the tunnel, which can be sometimes undesirable due to the reduction of weight on the front skis. However, the rear suspension assembly 132 of the present invention is designed to counteract this upward movement.

The rear suspension assembly 132 counteracts weight transfer by creating a force that opposes the upward movement of the front portion 220 of the tunnel 108. The weight transfer induces the rear suspension arms 164 to rotate toward the slide rails 146 (illustrated by the counterclockwise oriented arcuate solid arrow 454). The motion of the rear suspension arms 164 in turn compresses the rear shock absorber 196. Forces are transferred to the left and right links 402 via the rear shock absorber 196. This results in downward vertical forces 452 (only one of which is shown, illustrated by hatched arrow 452) acting on pivot points 300 where the front suspension arms 154 connect to the tunnel 108. The downward forces 452 induce a rotation of the front suspension arms 164 about the pivot axis 303 thus pulling the front portion 220 of the tunnel 108 toward the slide rails 146 and helping the tunnel 108 to keep a generally horizontal, or neutral orientation. Inducing movement of the tunnel 108 toward the slide rails 146 also induces the compression of the front shock absorber 180.

FIG. 7 shows an arcuate solid arrow 460 indicating motion of the rear suspension arms 164 and a straight solid arrow 458 showing movement of the rear portion 222 of the snowmobile 100 when the snowmobile 100 experiences decelerating with reference to the neutral position. When a snowmobile experiences deceleration, weight is transferred toward the front end of the snowmobile which results in a downward movement of the front portion of the tunnel. This will normally result in an upward movement of the rear portion of the tunnel, which can be sometimes undesirable do to the reduction of weight supported by the track which provides friction to slow down the snowmobile. However, the rear suspension assembly 132 of the present invention is designed to counteract this upward movement.

The rear suspension assembly 132 counteracts weight transfer by creating a force that opposes the movement of the front portion 220 of the tunnel 108. In contrast to acceleration, the weight transfer induced by deceleration causes a rotation of the rear suspension arms 164 away from the slide rails 146 (illustrated by the clockwise oriented solid arcuate arrow 460). The rear shock absorber 196 thus extends and the force is transferred to the left and right links 402 via the rear shock absorber 196. This results in upward forces (illustrated by hatched arrow 456, only one of which being shown) acting on pivot points 300 where the front suspension arms 154 connect to the tunnel 108. The upward forces 456 force the front suspension arms 154 to rotate about the pivot axis 303, thus pushing the front portion 220 of the tunnel 108 away from the slide rails 146 and helping the tunnel 108 to keep a generally horizontal or neutral orientation.

Figure 8:
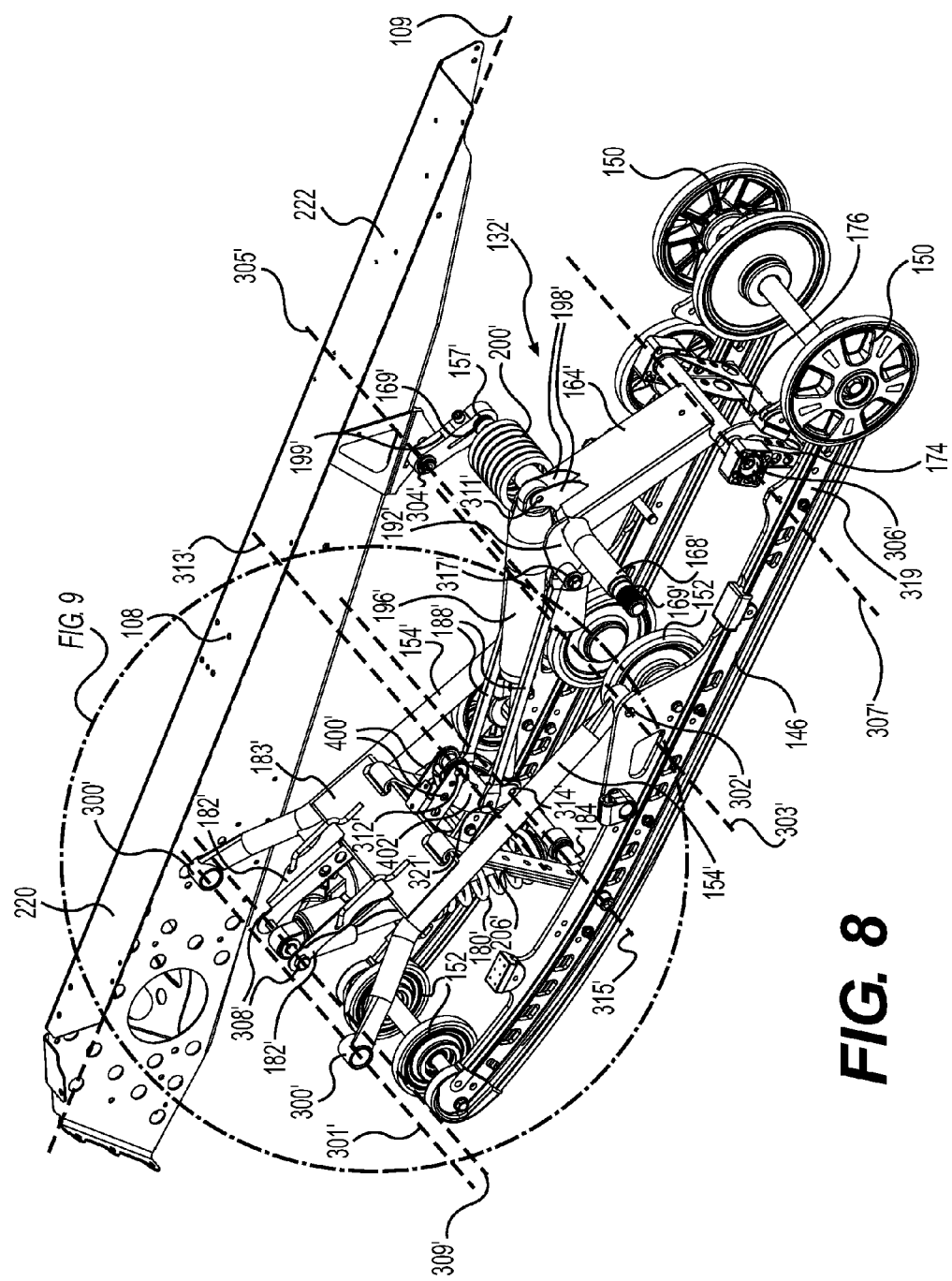
FIG. 8 is a perspective view taken from a rear, left side of a suspension assembly according to a second embodiment of the invention shown with some elements removed and the tunnel partially cut off added for clarity
Figure 9:
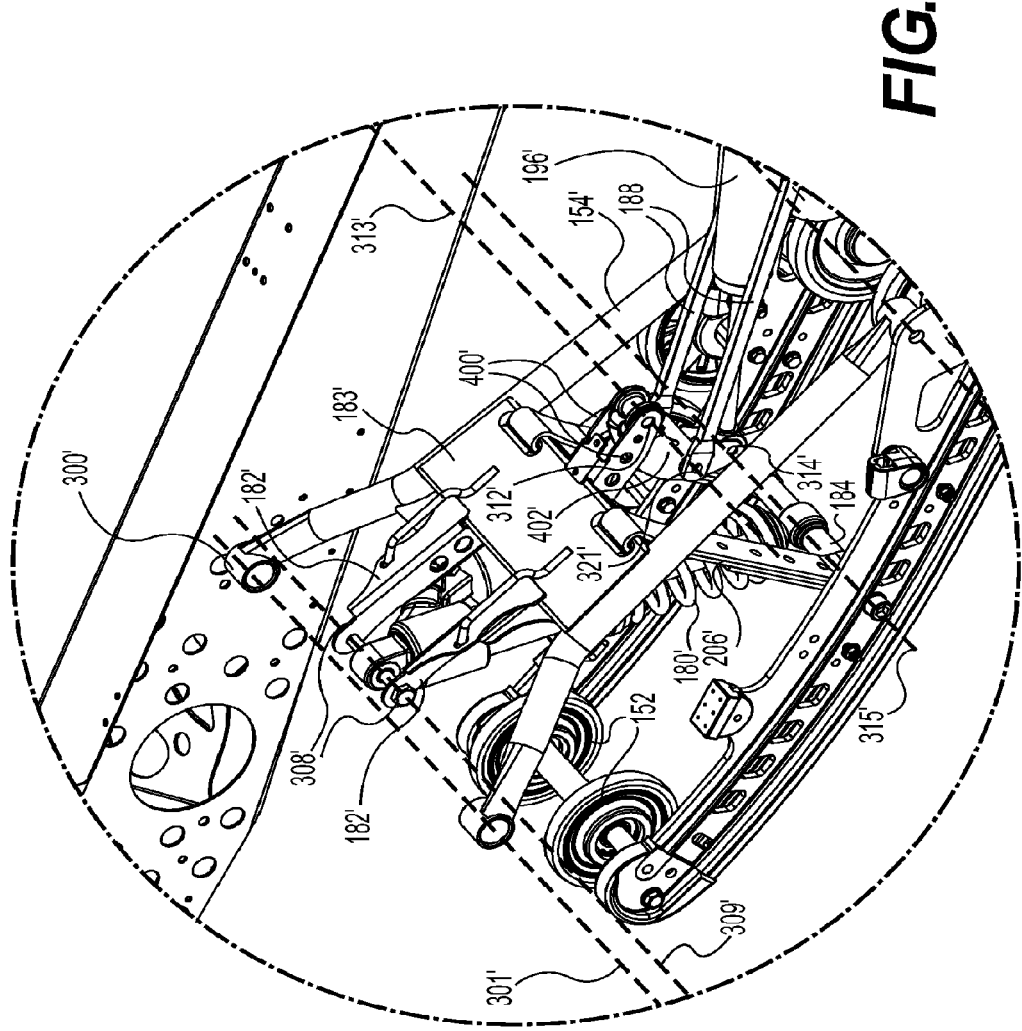
FIG. 9 is a close-up view of the circled portion of the suspension assembly of FIG. 8.
Figure 10:
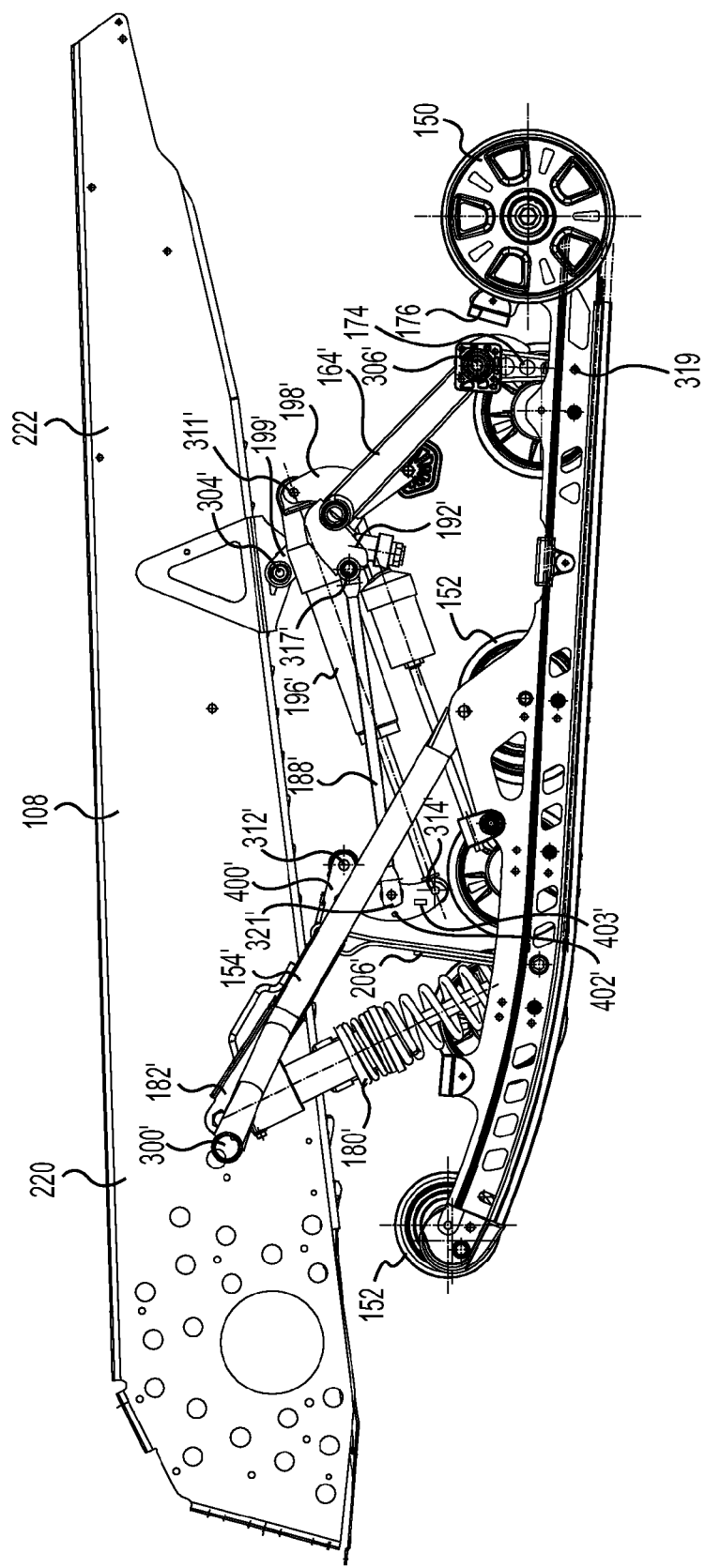
FIG. 10 is a left side elevation view of the suspension assembly of FIG. 8.

Referring to FIGS. 8 to 10, a rear suspension assembly 132' according to a second embodiment of the invention will now be described in greater details. For ease of understanding, elements of the rear suspension assembly 132' similar to the rear suspension assembly 132 will have the same reference numeral followed by a prime sign.

The rear suspension assembly 132' comprises left and right front suspension arms 154' and a single rear suspension arm 164'. It is contemplated that the rear suspension assembly 132' could comprise a pair of rear suspension arms 164'.

The front suspension arms 154' extend downwardly and rearwardly from the front portion 220 of the tunnel 108. Upper ends of the front suspension arms 154 are pivotally attached to the tunnel 108 at pivot points 300' to form a pivot axis 301' that is perpendicular to the longitudinal axis 109 of the tunnel 108. Lower ends of the front suspension arms 154' are each pivotally attached to their respective slide rails 146 of the slide frame assembly 144 at pivot point 302'. Left and right pivot points 302' define a pivot axis 303' perpendicular to the longitudinal axis 109 of the tunnel 108. The movement of the front portions of the slide rails 146 relative to the tunnel 108 of the chassis 106 causes the front suspension arms 154' to rotate about the axis 301', relative to the tunnel 108. The front suspension arms 154' are made of metal tubes having a generally circular cross-section. It is contemplated that the front suspension arms 154' could have other cross-sections, and that the front suspension arms 154' could be of another material than metal.

The rear suspension arm 164' extends downwardly and rearwardly from the rear portion 222 of the tunnel 108, and is disposed rearward of the front suspension arms 154'. The rear suspension arm 164' is a metal piece having a general rectangular cross-section. It is contemplated that the rear suspension arm 164' could have other shapes of cross-section, and that the rear suspension arm 164' could be of another material than metal. An upper end of the rear suspension arm 164' is pivotally connected to the tunnel 108 via a combination of a fixed connection to a shaft 168' and a pivot connection to two links 199' (only the left one being shown) as described below. It is contemplated that the upper ends of the rear suspension arm 164' could instead be connected to a tube and shaft assembly similar to the rear suspension arms 164. The shaft 168' has spline ends 169' which fixedly connect to second ends of the links 199' at points 157'. First ends of the links 199' are pivotally connected to the tunnel 108 at pivot points 304'. The pivot points 304' define a pivot axis 305' perpendicular to the longitudinal axis 109 of the tunnel 108.

A lower end of the rear suspension arm 164' is fixedly connected to the hollow cross bar 172. The hollow cross bar 172 is pivotally connected to the left and right rocker arms 174 at left and right pivot points 306'. The left and right pivot points 306' define a pivot axis 307' perpendicular to the longitudinal axis 109 of the tunnel 108.

The rear suspension arm 164' is coupled to the front suspension arms 154' by connecting a rear shock absorber 196' between the front suspension arms 154' and the rear suspension arm 164', as it will be described in greater details below. It is contemplated the coupling could be ensured differently.

A front shock absorber assembly 180' disposed between the tunnel 108 and the slide frame assembly 144 extends rearwardly and downwardly from the front portion 220 of the tunnel 108. The front shock absorber assembly 180' is disposed partially forward of the front suspension arms 154'. A lower end of the first shock absorber assembly 180' is disposed forwardly of lower ends of the front suspension arms 154'. The front shock absorber assembly 180' is similar to the shock absorber assembly 180 and will therefore not be described again.

The front shock absorber assembly 180' is operatively attached at an upper end thereof to a front bracket assembly comprising a plate 183' and two brackets 182'. The plate 183' is welded to the front suspension arms 154' and extends therebetween. It is contemplated that the plate 183' could not be a plate, and could be substituted by an actuate shaft similar to the shaft 183. The two brackets 182' are fixedly connected to the plate 183' near a center of the plate 183'. The upper end of the front shock absorber assembly 180' is pivotally connected to the brackets 182' at pivot points 308' such that an axial force is applied to the upper end of the front shock absorber assembly 180' when the front suspension arms 154' move with respect to the tunnel 108. The pivot points 308' define a pivot axis 309' perpendicular to the longitudinal axis 109 of the tunnel 108. The front shock absorber assembly 180' is pivotally connected to a lower end thereof to the slide frame assembly 144 via the shaft 184. The front shock absorber assembly 180' is adapted to rotate about the shaft 184, which defines the pivot axis 315'.

The rear shock absorber 196' extends forwardly and downwardly from the rear portion 222 of the tunnel 108, and is disposed at least in part rearwardly of the front suspension arms 154'. The rear shock absorber 196' is similar to the rear shock absorber assembly 180' and will therefore not be described again. The rear shock absorber 196' is connected at a lower end to the front suspension arms 154' via a pivot connection to left and right bracket arms 400' and the left and right links 402' (all described in greater details below). The rear shock absorber 196' is pivotally connected at its upper end to two brackets 198'. The brackets 198' are fixedly connected partially to the shaft 168' and partially to the rectangular tube forming the rear suspension arm 164'. It is contemplated that the rear bracket 198' could be fixedly connected fully to the shaft 168' or fully to the rectangular tube forming the rear suspension arm 164'.

Two tie rods 188' are disposed on each side of the rear shock absorber 196'. Upper ends of the tie rods 188' are pivotally connected to brackets 192' at pivot points 317'. The brackets 192' are fixedly connected to the shaft 168'. The brackets 192' are disposed on the shaft 168' at an angle with respect to the brackets 198'. Lower ends of the tie rods 188' are pivotally connected to the links 402' as will be described below.

The left and right bracket arms 400' have upper ends fixedly connected to the plate 183', and are disposed adjacent to each other, near a center of the plate 183'. Second ends of the left and right bracket arms 400' are pivotally connected to first ends of corresponding left and right links 402' at pivot points 312'. The pivot points 312' define a pivot axis 313' perpendicular to the longitudinal axis 109 of the tunnel 108. Second ends of the left and right links 402' are pivotally connected to the lower end of the rear shock absorber 196' at pivot points 314' or 403'. The pivot points 314' define a pivot axis 315' perpendicular to the longitudinal axis 109 of the tunnel 108. Contrarily to the first embodiment, the second ends of the left and right links 402' are not pivotally connected to corresponding left and right tie rods 188'. Instead, the left and right tie rods 188' connect to a middle of a corresponding link 402' at pivot points 321' or 403'. As a consequence, a pivot axis of the lower end of the shock absorber 196' is different from a pivot axis of the lower end of the tie rods 188'. Pivot point 403' enables the suspension characteristics to be modified to adjust to personal preference. It is contemplated that the points 321', 314' and 403' could be curved slots instead of individual points to allow for many easily-adjustable different positions of the lower ends of the tie rods 188' or shock absorber 196'.

Similarly to the first embodiment, the position and dimension of the left and right bracket arms 400' and the left and right links 402' are such that a distance B between the pivot axes 315' and 303' is at least A/3, when A is a distance computed at the neutral position between the pivot axes 301' and 303'.

Left and right torsion springs 200' (only the right one being shown in FIG. 8) are provided in order to push the slide frame assembly 144 apart from the tunnel 108 of the chassis 106, and to maintain the front and rear shock absorber assemblies 180', 196' substantially in extended condition when no substantial loads are applied thereon. The left and right torsion springs 200' surround the shaft 168' and are positioned on each side of the rear suspension arm 164'. A first free end (not shown) of each of the torsion springs 200 is abutting the shaft 168', and a free second end (not shown) thereof is abutting the slide frame assembly 144, under a preloaded condition so that a predetermined torsion of force is applied to the rear suspension arm 164', tending to pivot the rear suspension arm 164' about the links 199' away from the tunnel 108 of the chassis 106. It is contemplated that only one torsion spring could be used.

Left and right flexible tensions straps 206', similar to the flexible straps 206, are attached at their upper ends to the plate 183', and at their lower ends to the slide frame assembly 144 by means of the shaft 184.

Operation of the rear suspension assembly 132' is substantially similar to the operation of the rear suspension assembly 132 except for the absence of the rotation at the tube 166 and shaft 168 that has been substituted by the link 199' pivoting with respect to the tunnel 108. Upon motion of the rear suspension arm 164', the rear shock absorber 196' is actuated and the left and right tie rods 188' move. The links 199', the rear shock absorber 196', the tie rods 188' and the links 402' form an assembly through which the pivotal movement of the links 199' (and therefore the rear suspension arm 164') about the pivot axis 305' and relative to the tunnel 108 of the chassis 106, forces the left and right bracket arms 400' to act on the front suspension arms 154' thereby applying a force to the front portion 220 of the tunnel 108, and thereby actuating the front shock absorber assembly 180'.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A suspension assembly for a snowmobile having a chassis and an endless drive track, the suspension assembly comprising:
    a rail for engagement with the endless drive track;
    a first suspension arm having an upper end adapted for pivotally connecting to the chassis and a lower end pivotally connected to the rail, the first suspension arm extending forwardly and upwardly from the rail;
    a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail;
    a bracket arm having a first end and a second end, the first end of the bracket arm being fixedly connected to the first suspension arm between the upper end and the lower end of the first suspension arm;
    a link having a first end and a second end, the first end of the link being pivotally connected to the second end of the bracket arm above the first suspension arm at a link pivot axis;
    a shock absorber having an upper end and a lower end, the lower end of the shock absorber being pivotally connected to the second end of the link about a first pivot axis, the first pivot axis being perpendicular to a longitudinal axis of the chassis, the first pivot axis being located between the upper and lower ends of the first suspension arm, the first pivot axis being disposed such that the first suspension arm is disposed between the first pivot axis and the link pivot axis, the upper end of the shock absorber being pivotally connected to the second suspension arm; and
    a tie rod having a lower end and an upper end, the lower end of the tie rod being pivotally connected to the link, and the upper end of the tie rod being pivotally connected to the second suspension arm;
    a point adapted for pivotally connecting the second suspension arm to the chassis being vertically higher than a pivotal connection between the upper end of the shock absorber and the second suspension arm.

2. The suspension assembly of claim 1, wherein the link is a first link;
    the suspension system further comprising a second link having the point adapted for pivotally connecting the second suspension arm to the chassis, the upper end of second suspension arm being adapted to be pivotally connected to the chassis via a fixed connection to the second link, the fixed connection between the second suspension arm and the second link being vertically higher than the pivotal connection between the upper end of the shock absorber and the second suspension arm.

3. The suspension assembly of claim 1, wherein the tie rod is pivotally connected to the second end of the link about the first pivot axis.

4. The suspension assembly of claim 3, wherein the second end of the bracket arm extends rearwardly and downwardly from the first end of the bracket arm.

5. The suspension assembly of claim 3, wherein
    the shock absorber is a second shock absorber;
    the first end of the link is pivotally connected to the second end of the bracket arm about the link pivot axis, the link pivot axis being perpendicular to the longitudinal axis of the chassis, and the link pivot axis is above of the first pivot axis; and
    further comprising
    a first shock absorber having an upper end and a lower end, the upper end of the first shock absorber being pivotally connected to the first suspension arm, the lower end of the first shock absorber being pivotally connected to the rail, and the lower end of the first shock absorber being disposed forwardly of the lower end of the first suspension arm.

6. The suspension assembly of claim 5, wherein the first end of the bracket arm is fixedly connected to the first suspension arm at a point disposed upwardly of the link pivot axis.

7. The suspension assembly of claim 5, wherein the upper end of the first suspension arm is adapted for pivotally connecting to the chassis about a second pivot axis, the upper end of the first shock absorber is pivotally connected to the first suspension arm about a third pivot axis, the third pivot axis being perpendicular to the longitudinal axis of the chassis, and the lower end of the first suspension arm is pivotally connected to the rail about a fourth pivot axis, the fourth pivot axis being perpendicular to the longitudinal axis of the chassis; and
    wherein when the snowmobile is at rest with no load applied thereon, a distance between the link pivot axis and the fourth pivot axis is at least a third of a distance between the second pivot axis and the fourth pivot axis.

8. The suspension assembly of claim 3, wherein the upper end of the first suspension arm is adapted for pivotally connecting to the chassis about a second pivot axis, the second pivot axis being perpendicular to a longitudinal axis of the chassis; and wherein, when the snowmobile experiences deceleration, an upward reaction force is created at the second pivot axis.

9. The suspension assembly of claim 3, wherein the upper end of the first suspension arm is adapted for pivotally connecting to the chassis about a second pivot axis, the second pivot axis being perpendicular to a longitudinal axis of the chassis, and when the snowmobile experiences acceleration, a downward reaction force is created on the second pivot axis.

\* \* \* \* \*

UNITED STATES PATENT AND TRADEMARK OFFICE
CERTIFICATE OF CORRECTION

| | | |
|---|---|---|
| PATENT NO. | : 9,114,852 B2 | |
| APPLICATION NO. | : 14/101613 | |
| DATED | : August 25, 2015 | |
| INVENTOR(S) | : Berthold Fecteau et al. | |

It is certified that error appears in the above-identified patent and that said Letters Patent is hereby corrected as shown below:

Claims

Claim 2, Column 14, line 20, "second suspension" should read -- the second suspension --

Signed and Sealed this
Nineteenth Day of January, 2016

Michelle K. Lee
*Director of the United States Patent and Trademark Office*